United States Patent [19]
Dinitz

[11] Patent Number: 6,056,471
[45] Date of Patent: May 2, 2000

[54] MULTIPLE NECKED-DOWN BREAK-AWAY COUPLING FOR HIGHWAY OR ROADSIDE APPURTENANCES

[75] Inventor: Arthur Dinitz, Westport, Conn.

[73] Assignee: Transpo Industries, Inc., New Rochelle, N.Y.

[21] Appl. No.: 09/096,441

[22] Filed: Jun. 11, 1998

[51] Int. Cl.[7] .................................................. F16D 9/00
[52] U.S. Cl. ........................................ 403/2; 411/5; 52/98
[58] Field of Search ........................... 403/2, 270; 411/3, 411/5, 389; 40/606, 607; 52/100, 98, 296; 248/548, 909

[56] References Cited

U.S. PATENT DOCUMENTS

| | | | |
|---|---|---|---|
| 2,177,927 | 10/1939 | Hodge | 403/270 |
| 3,444,775 | 5/1969 | Hills | 411/3 |
| 3,521,413 | 7/1970 | Scott et al. | 248/548 |
| 3,570,376 | 3/1971 | Overton . | |
| 3,606,222 | 9/1971 | Howard . | |
| 3,637,244 | 1/1972 | Strizki | 52/98 X |
| 3,755,977 | 9/1973 | Lewis . | |
| 3,837,752 | 9/1974 | Shewchuk | 403/2 |
| 3,951,556 | 4/1976 | Strizki | 403/2 |
| 3,967,906 | 7/1976 | Strizki . | |
| 4,923,319 | 5/1990 | Dent | 403/2 |
| 5,474,408 | 12/1995 | Dinitz et al. | 403/2 X |

*Primary Examiner*—Lynne H. Browne
*Assistant Examiner*—John R. Cottingham
*Attorney, Agent, or Firm*—Lackenbach Siegel Marzullo Aronson & Greenspan

[57] ABSTRACT

In a break-away coupling for a highway and road side appurtenance, a controlled breaking region is provided which has at least two axial spaced necked-down portions co-axially arranged between the axial ends of the coupling which are configured to be attached both to the appurtenance, at one end, and to the support base, at the other end. Each necked-down portion essentially consists of two axially aligned conical portions inverted one in relation to the other and generally joined at their apices to form a generally hour-glass configuration having a region of minimal cross section at an inflection point having a gradually curved annular concave surface defining a radius of curvature. Each of the two necked-down portion has different radii of curvature that at respective inflection points to provide preferred failure modes as a function of the position and direction of impact of a force on the appurtenance.

16 Claims, 4 Drawing Sheets

MULTIPLE NECKED-DOWN BREAK-AWAY COUPLING FOR HIGHWAY OR ROADSIDE APPURTENANCES

BACKGROUND OF THE INVENTION

1. Field of the Invention

The present invention generally relates to lighting poles and appurtenances mounted along highways and roadways, and, particularly to a multiple necked-down break-away coupling for supporting such lighting poles and other appurtenances which are frangible and facilitate the disengagement of a lighting pole or the like from the base on which it is mounted to minimize bodily and property damage when an automobile collides with a lighting pole or other highway appurtenance.

2. Description of the Prior Art

Many highway and roadside appurtenances, such as lighting poles, signs, etc., are mounted along highways and roads. Typically, these are mounted on and supported by concrete foundations, bases or footings. However, while it is important to securely mount such roadside appurtenances to withstand weight, wind, snow and other types of service loads, they do create a hazard for vehicular traffic. When a vehicle collides with such a light pole or sign post, for example, a substantial amount of energy is normally absorbed by the light pole or post as well as by the impacting vehicle unless the pole or post it is mounted to be readily severed from the base. Unless the post is deflected or severed from the base, therefore, the vehicle may be brought to a sudden stop with potentially fatal or substantial injury to the passengers. For this reason, highway authorities almost universally specify that light poles and the like must be mounted in such a way that they can be severed from the support structure upon impact by a vehicle.

In designs of such break-away couplings several facts or considerations come into play. The couplings must have maximum tensile strength with predetermined (controlled) resistance to bending. Additionally, the couplings must be easy and inexpensive to install and maintain. They must, of course, be totally reliable.

Numerous break-away systems have been proposed for reducing damage to a vehicle and its occupants upon impact. For example, load concentrated break-away couplings are disclosed in U.S. Pat. Nos. 3,637,244, 3,951,556 and 3,967,906 in which load concentrating elements eccentric to the axis of the fasteners, for attaching the couplings to the system oppose the bending of the couplings under normal loads while presenting less resistance to bending of the coupling under impact or other forces applied near the base of the post. In U.S. Pat. Nos. 3,570,376 and 3,606,222, structures are disclosed which include a series of frangible areas. In both cases, the frangible areas are provided about substantially cylindrical structures. Accordingly, while the supports may break along the frangible lines, they do not minimize forces for bending of the posts and, therefore, generally require higher bending energies, to the possible determent of the motor vehicle.

In U.S. Pat. No. 3,755,977, a frangible lighting pole is disclosed which is in a form of a frangible coupler provided with a pair of annular shoulders that are axially spaced from each other. In a sense, the annular shoulders are in the form of internal grooves. A tubular section is provided which is designed to break in response to a lateral impact force of an automobile. The circumferential grooves are provided along a surface of a cylindrical member.

A coupling for a break-away pole is described in U.S. Pat. No. 3,837,752 which seeks to reduce maximum resistance of a coupler to bending fracture by introducing circumferential grooves on the exterior surface of the coupler. The distance from the groove to the coupler extremity is described as being approximately equal to or slightly less than the inserted length of a bolt or a stud that is introduced into the coupler to secure the coupler, at the upper ends, to a base plate that supports the post and to the foundation base or footing on which the post is mounted. The grooves are provided to serve as a stress concentrators for inducing bending fracture and to permit maximum effective length of moment arm and, therefore, maximum bending movement. The invention design is intended to have the grooves provide better control on the bending strength applied by a vehicle before severance or fracture takes place. The grooves in the patent are generally shallow and of a rectangular cross-section. Because the coupler is provided with a central axial bore for the introduction of a bolt, the coupler is cylindrical in form and is not a solid member. Also, because the coupler described in the patent has a cylindrical bore in the middle, very little of the metal is situated on the neutral axis (along the central axis) about which bending takes place, so that, for a given cross-section of material required to withstand a predetermined amount of tensile and compressive stress, the coupler disclosed in the patent is more resistant to bending than a comparable solid member. Because the patent requires that the bolts or studs penetrate at least as deep as the end of the notch or groove, the design is not practical since such design requires that the bolts or studs to bend simultaneously with the coupler about the notch or groove, at least to some degree, during impact. However, it is a major drawback to have the bolts or studs have any effect on the breaking strength of the part since control over the breaking characteristics of the coupler are lost and the point at which the coupler breaks is a function of a system consisting of the coupling as well as the bolt or stud. This patent also requires that the geometry of the shape of the base (the inner or bottom surface) of the groove is to be used to produce the required weakness in bending. According to the patent, the diameter of the neck is not the variable to manipulate in order to achieve the desired strength of the part, as the axial (tensile/compressive) strength is also affected.

SUMMARY OF THE INVENTION

It is, accordingly, an object of the present invention to provide a break-away coupling for a highway or roadway appurtenance which does not have the disadvantages inherent in comparable prior art break-away couplings.

It is another object of the present invention to provide a break-away coupling which is simple in construction and economical to manufacture. It is still another object of the present invention to provide a break-away coupling of the type under discussion which is ample to install and requires minimal effort and time to install in the field.

It is yet another object of the present invention to provide a break-away coupling as in the aforementioned objects which is simple in construction an reliable, and whose functionality is highly predictable.

It is yet another object of the present invention to provide a break-away coupling as in the previous objects which can be retrofitted to most existing break-away coupling systems.

It is still a further object of the present invention to provide a break-away coupling which minimizes forces required to fracture the coupling in bending while maintaining safe levels of tensile and compressive strength to withstand non-impact forces, such as wind load.

It is yet a further object of the present invention to provide break-away couplings of the type suggested in the previous objects which essentially consists of one part and, therefore, requires minimal assembly in the field and handling of parts.

It is an additional object of the present invention to provide a break-away coupling in which the failure mechanism can be better controlled to insure failure at one of two spaced necked-down portions.

In order to achieve the above objects, as well as others which will become apparent hereafter, a multiple necked-down break-away coupling for a highway and roadside appurtenance is provided to be mounted on a base. The coupling defines an axis and comprises a controlled breaking region arranged along said axis and the coupling has opposing axial ends. First connecting means is provided for connecting one of said opposing axial ends to the highway or roadside appurtenance. A second connecting means is provided for connecting another one of said opposing axial ends to the base on which the highway or roadside appurtenance is to be mounted. Said controlled breaking region includes at least two axially spaced necked-down portions co-axially arranged between said first and second connecting means. Each necked-down portion essentially consists of two axially aligned conical portions inverted one in relation to the other and generally joined at their apices to form a generally hour-glass shaped configuration having a region of minimal cross-section at an inflection point having a gradually curved annular concave surface and defining a radius of curvature. Each of the two necked-down portions having different radii of curvature at respective inflection points to provide preferred failure modes as a function of the position and direction of impact of a force on the appurtenance.

BRIEF DESCRIPTION OF THE DRAWINGS

The invention will be thoroughly understood from the following description of a preferred embodiment thereof as read in conjunction with the accompanying drawings, in which.

DESCRIPTION OF THE PREFERRED EMBODIMENTS

Figure 1:
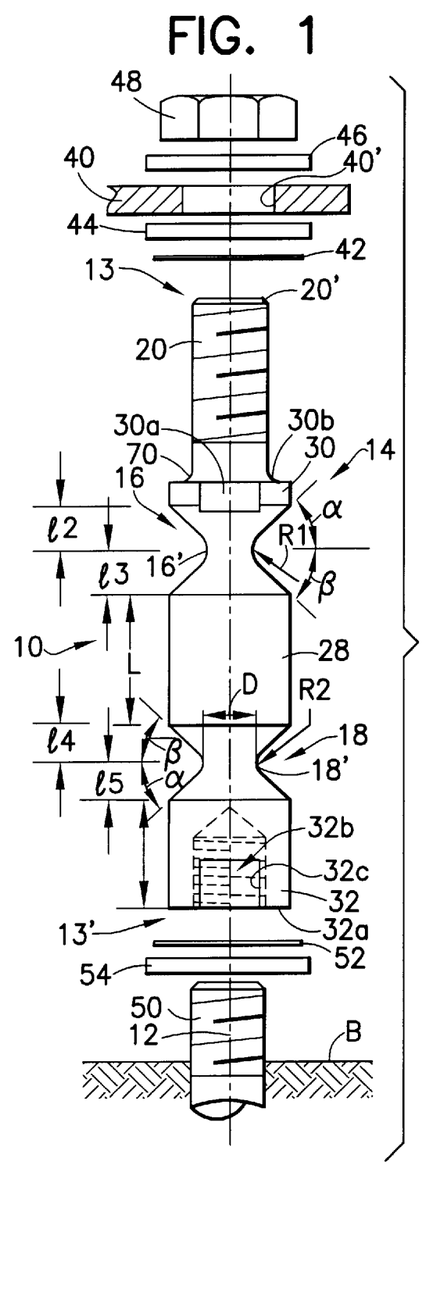
FIG. 1 is an exploded view, in front elevation, of a multi necked-down break-away coupling in accordance with the present invention which is provided with one internally threaded axial end for use with a male anchor imbedded in a support base.
Figure 2:
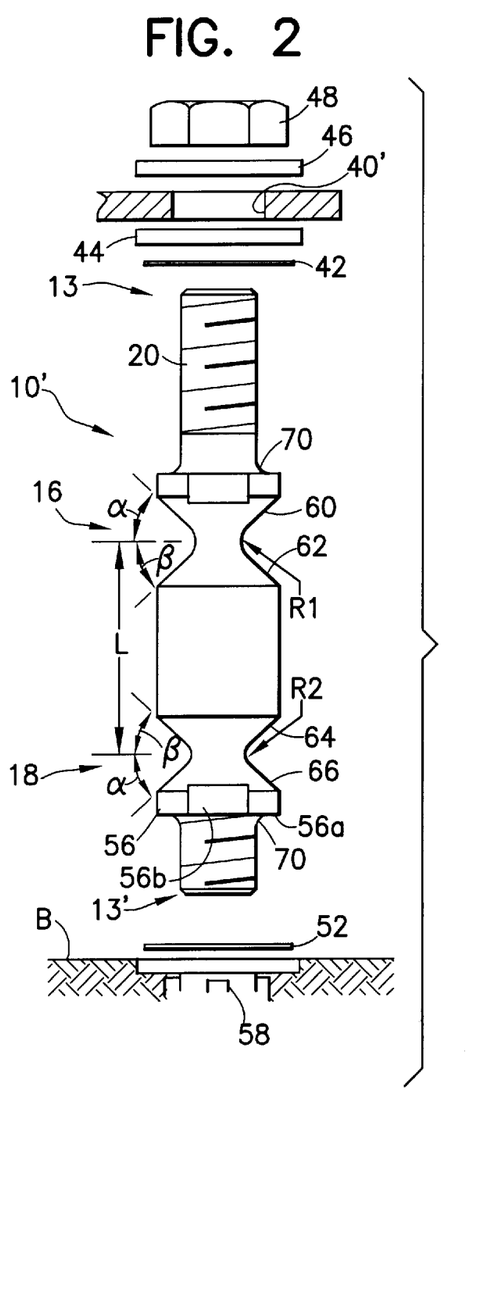
FIG. 2 is an exploded, view in front elevation, a multi necked-down break-away coupling similar to FIG. 1, but provided with two externally threaded axial ends, one of which cooperates with a female anchor imbedded in a support base.

Referring now specifically to the Figures, in which identical or similar parts are designated by the same reference numerals throughout and first referring to FIGS. 1 and 2, a multiple necked-down break-away coupling for a highway and roadside appurtenance to be mounted on the base B, which is illustrated in FIG. 1 as a concrete slab forming a foundation, is generally defined by the reference numeral 10.

The coupling 10 generally defines an axis 12 and has opposing axial ends, shown in FIG. 1 to include an upper axial end 13 and a lower axial end 13'. A controlled breaking region, generally defined by the reference numeral 14 is arranged along the axis 12 between the opposing axial ends 13, 13'. The controlled breaking region 14 includes two axial spaced necked-down portions 16, 18 to be more fully described below.

At one axial end 13, a suitable connecting member is provided for connecting the axial end 13 to the highway or roadside appurtenance. In the embodiment illustrated in FIG. 1, such connecting member is in the form of an externally threaded bolt 20, arranged along the axis 12 and advantageously provided with a chamfer 20'.

The two necked-down portions 16, 18 are separated by a central cylindrical portion 28 which is generally of uniform circular cross-section along the axis 12 and dimensioned to remain rigid and unbending relative to the necked-down portions 16, 18.

Provided between the threaded bolt 20 and the necked-down portion 16, there is provided an upper cylindrical portion 30 which includes at least one circumferential flat surface 30a, and preferably two such diametrically opposing flat surfaces, which may be readily engaged by a wrench or the like for transmitting torque from the wrench to the upper portion 30. The upper portion 30 is also advantageously provided with a generally flat surface 30b normal to the axis 12 from which the threaded bolt 20 projects and which is suitable for abutment against the roadside appurtenance or related components for securing the appurtenance to the threaded bolt 20.

At the lower axial end 13', a lower cylindrical portion 32, generally of similar diametrical dimensions as the upper portion 30, includes a generally flat surface 32a suitable for engagement or abutment against the base or related components for mounting the appurtenance on the base B. The lower portion 32, in the embodiment shown, includes an internal axial bore 32b which is provided with internal threads 32c.

By way of example only, according to one method of securing the coupling 10 to a highway or roadside appurtenance, there is illustrated a Pole base plate 40 which has an internal hole 40' dimensioned to receive the threaded bolt 20 with some clearance. A steel shim 42 may be used for adjusting the elevation of the Pole base plate 40 in relation to the support surface 30b. Washers 44, 46, provided on both sides of the Pole base plate 40 may be in the form of lock washers for preventing the parts from moving relative to each other once the appurtenance is secured on the coupling 10 by means of a threaded nut 48.

At the lower axial end 13', an externally threaded bolt 50 is shown imbedded within the base B to form a low stub projection male anchor which is threadedly receivable within the threaded bore 32b in the lower portion 32 of the coupling. Similarly, an optional shim 52 may be used to level or vertically position the coupling 10 in a desired elevation. As with the upper axial end 13, a suitable washer 54 may be used which may also be in the form of a lock washer to prevent relative movements between the coupling 10 and the bolt 50 once the coupling is assembled.

In accordance with an important feature of the present invention, each necked-down portion 16, 18 essentially consists of two axially aligned conical portions 60, 62 and 64, 66 (FIG. 2) inverted one in relation to the other and generally joined at their apices to form a generally hourglass shaped configuration having regions of minimal cross-section at inflection points 16', 18', respectively, as shown. Each of the inflection points 16', 18' has a gradually curved annular concave surface refining a radius of curvature $R_1$, and $R_2$ at the upper and lower necked-down portions respectively. Each of the two necked-down portions 16, 18 have different radii of curvature at respective inflection points to provide different failure modes to insure that maximum bending and severance first occur at the lower necked-down portion 18 to minimize engagement with the under carriage of an advancing vehicle.

The two necked-down portions 16, 18 are spaced from each other and proximate to another one of the associated connecting members 20, 32b to provide an enlarged or central portion 28 between the two necked-down portions that serves as a pivoting arm about which bending of the necked-down portions can take place.

In FIG. 2, a similar coupling 10' is shown which is very similar to the coupling 10 shown in FIG. 1 with the exception that the lower axial end 13' includes a lower portion 56 is provided with a downwardly projecting externally threaded bolt 22 which extends from a downwardly facing abutment surface 56a. One, and preferably two opposing, flat wrench engagement surfaces 56b are provided about the circumferential region of the lower portion 56. The embodiment illustrated in FIG. 2 is intended to be used with a female anchor 58 imbedded within the concrete slab or base B which is provided with an internally threaded opening dimensioned and configured to receive the externally threaded bolt 22. Aside from the axial terminations on connector constructions of the couplings, the couplings 10 and 10' may be identical and the description that follows will apply to both couplings.

As best shown in FIG. 2, each of the two conical portions 60 and 62 of the upper break-away portion and conical portions 64, 66 of the lower break-away 16 each define a base angle in relation to a plane normal to the axis 12. Referring to the upper break-away portion 16, the upper conical surface 60 forms an angle α with the base or horizontal plane and the lower conical portion 62 forms an angle β with it's base or a horizontal plane. The angles α and β of the same necked-down portion may be equal. In the presently preferred embodiment, the α and β angle are equal to approximately 45°. However, the angles α and β may be different from each other without causing significant deterioration of performance. Also, it is possible that the angles α of the upper and lower necked-down portions may be the same or different. The same applies for the alternate angles β.

It has been determined that, for most applications, the axial distance L between the two inflection points 16', 18' or the points of minimal diameter is preferably selected within the range of approximately 3–4 inches.

As indicated, the radii of curvature $R_1$ and $R_2$ are different from each other in accordance with the present invention and the radii of curvature are preferably selected from the range of approximately 0.1 to 0.225 inches. In the presently preferred embodiment, the radius of curvature $R_1$ of one necked-down portion is approximately 0.125 inches and the radius of curvature $R_2$ of the other necked-down portion is approximately 0.2 inches. It has also been found that the radii of curvature may be selected to have first and second predetermined values substantially independently of the parameters or dimensions of the necked-down portions. Therefore, while the radii of curvature may be substantially fixed, the circular cross-sections of the inflection points can vary for differently sized couplings. The diameter D of the necked-down portions 16, 18 at the inflection points are preferably selected within a range of approximately 0.4 to 0.7 inches.

Referring to FIGS. 1 and 2, it is advantageous to provide a round or fillet 70 at the junction(s) where the threaded bolts 20 and the upper portion 30 and/or lower portion 32 (FIG. 2) meet to provide a gradual transition from the diameters of the bolts to the diameters of the associated coupler portions. Without the fillets (70), it has been found that sharp discontinuities at the interfaces mentioned, upon impact very high velocity vehicle on the coupling, can cause the bolts to shear at their bases where they join the surfaces 30b and/or 56a. By providing the fillets 70, this assures that the abrupt changes in stress at the connected portions of the threaded bolts do not exhibit a weak link which can fail before failure at the desired necked-down portions. Clearly, failure at the upper surface 30b would be undesirable since this would result in the remaining part of the coupling below surface 30b to remain intact and project above the ground a considerable distance which would likely engage the undercarriage of a motor vehicle. The purpose of the fillets 70, therefore, are to assure that the mechanism failure can be focused or centralized at a desired failure point and prevent, to the maximum possible, failure at other longitudinal or axial points of the coupling.

Figure 3:
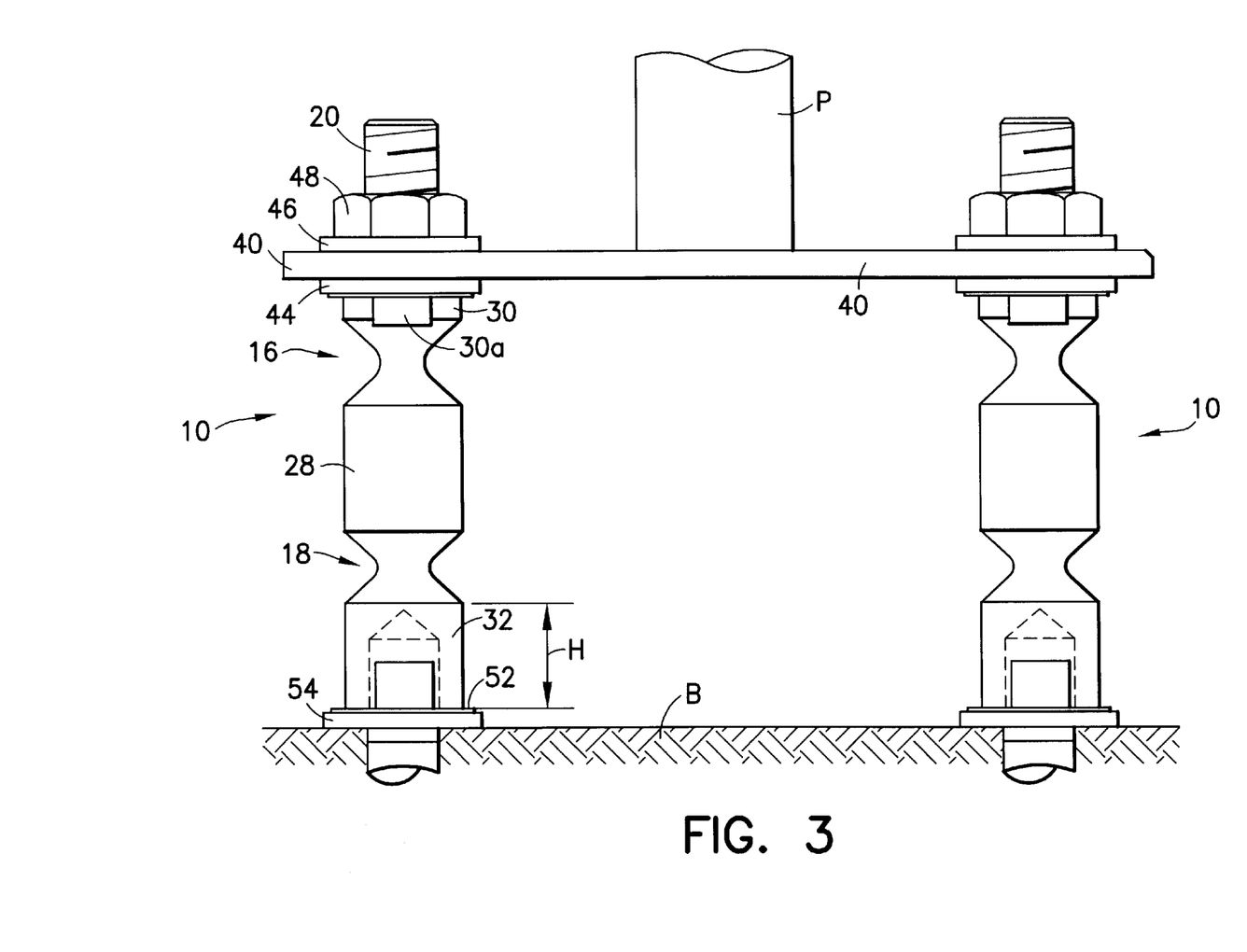
FIG. 3 is a side elevational view of a support system for a roadside appurtenance, such as a lamp pole, supported on four (4) multiple necked-down breakaway couplings in accordance with the present invention, of the type shown in FIG. 1, after assembly and prior to impact by a vehicle.
Figure 4:
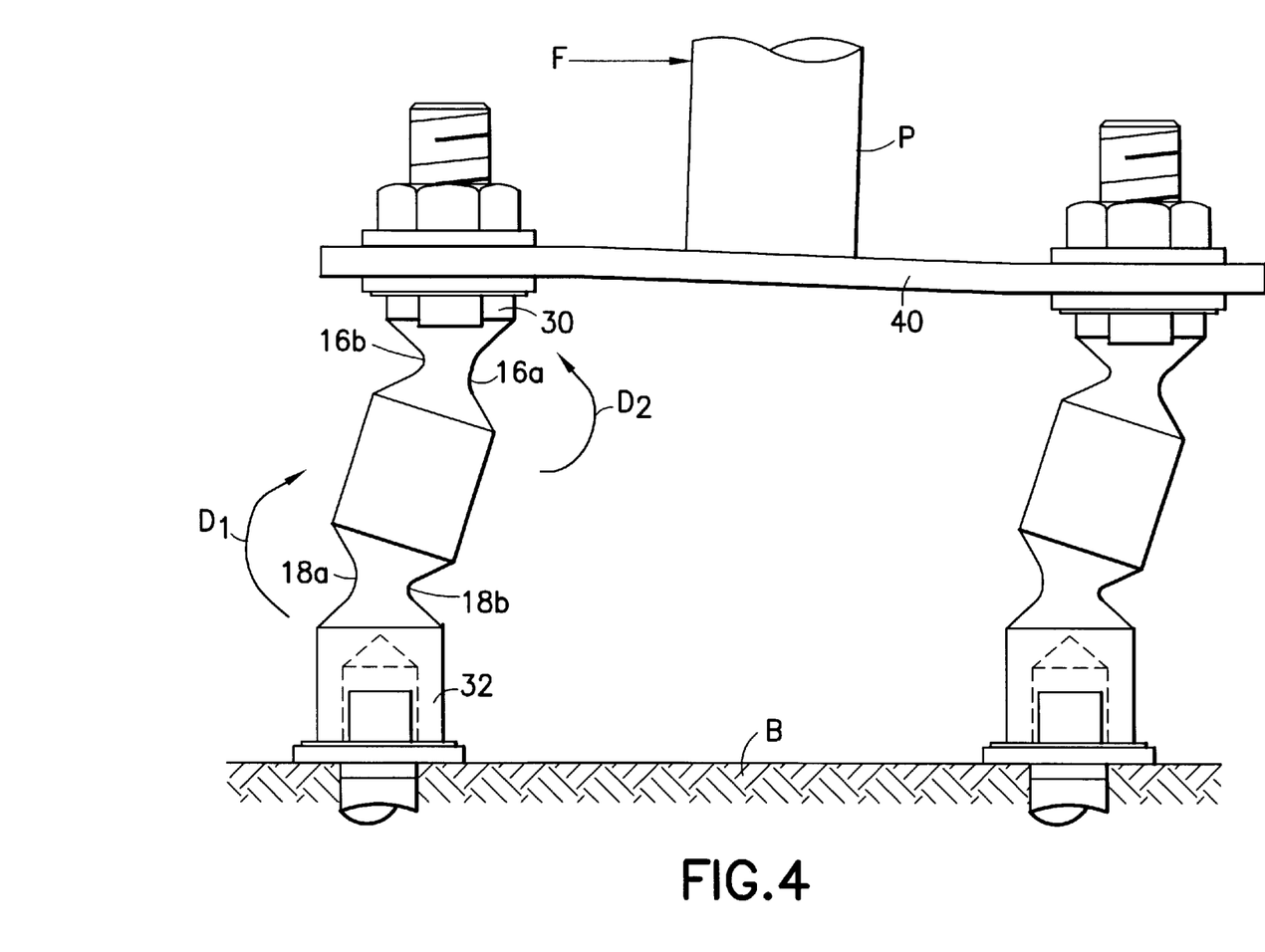
FIG. 4 is similar to FIG. 3, but showing the initial bending or deformations at the necks of the coupling immediately after impact.
Figure 5:
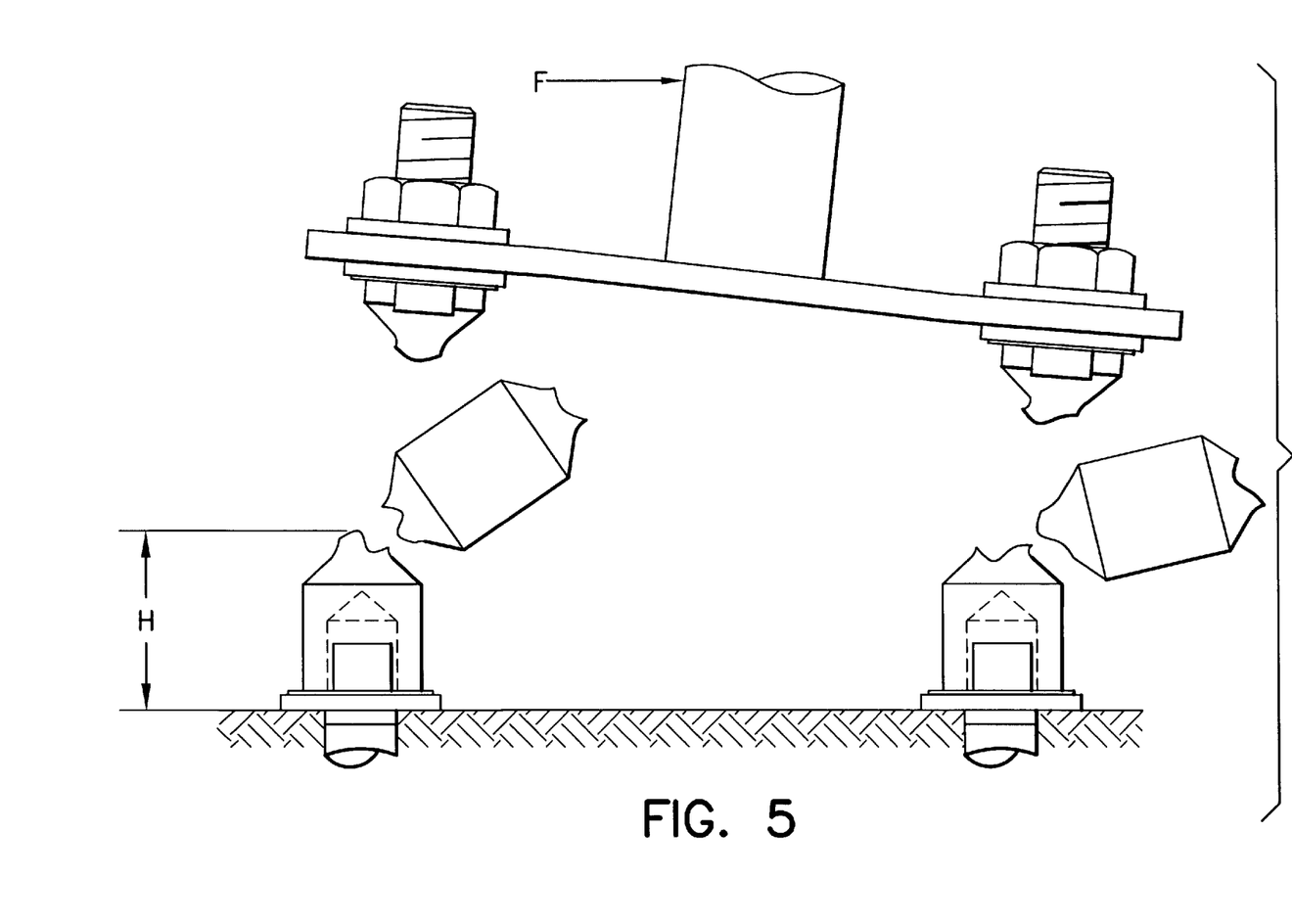
FIG. 5 is similar to FIG. 4 but showing the support system shown in FIG. 4 after the couplings have been sufficiently bent to sever at the necks to thereby cause separation between the pole supporting platform and the lower portions of the couplings anchored to the base or ground.

Referring now to FIGS. 3–5, the operation of the couplings in accordance with the present invention will be described. In FIG. 3, a support system for a lighting Pole is shown which may be relatively conventional with the exception of the specific couplings 10 which embodies the present invention. Most of the components or elements shown in FIG. 3 have already been described in connection with FIGS. 1 and 2. In FIG. 3, all of the components are assembled in a conventional manner, which would be well known to those skilled in the art. Prior to impact, typically four couplings 10 are provided at four corners of a generally rectangular base or support plate 40 upon which a Pole P is fixedly mounted. In FIG. 4, a Force F is shown which acts on the Pole and represents the force of a vehicle which impacts upon the Pole. The Force F will urge the base plate 40 to move or be shifted to the right, as viewed in FIG. 4. However, since the lower portions 32 of the coupling are rigidly affixed to the base or ground B, there will generally be a clockwise rotation of that portion of the coupling above the neck 18 as suggested by Arrow $D_1$. Such relative rotation would cause stretching at 18a on the side of impact, while compression would take place at the opposite side at point 18b. The opposite bending would normally take place at the upper necked-down portion 16 where bending of the upper portion 30 is in a counter-clockwise direction in relation to the coupling below the neck 16. By selecting the radii of curvature $R_1$ and $R_2$ as described, the degrees of rotations $D_1$ and $D_2$ relative to each other can be better controlled.

The rotation $D_2$ is in a counter-clockwise direction because, while the base plate 40 shifts towards the right, as viewed in FIG. 4, there is initially little rotation of the Pole P because of the inertia of the Pole and it's tendency to remain generally upright for a considerable period of time. Therefore, since the base plate 40 remains substantially horizontal while it is shifting towards the right, this causes the upper portions 30 to remain generally in their orientations while the central portion undergoes most of the movement or shifting. Referring to FIG. 5, it will be clear that continued bending at the necks 16, 18, will ultimately cause the necks to rupture, as suggested in FIG. 5. When this occurs, even while the base plate 40 and the Pole are still generally in orientation similar to that originally assumed in FIG. 3, although shifted somewhat to the right, a considerable amount of deformation at the necks will result in failure, at least at the lower neck 18 and preferably at both necks as shown in FIG. 5.

The coupling of the present invention can be used to support light poles, sign supports, or any other structural supports which have the surface loads applied higher up from the ground and are expected to breakaway easily when impacted by a vehicle. The couplings have the ability to breakaway, upon impact, from any direction and, unlike slip-based systems, does not require any maintenance. Simplicity of the product makes installation easy and without any special training, jigs or tools.

In crash tests, the couplings of the present invention have performed consistently well. Set forth below are the test results of first a crash test of TRANSPO Pole Safe Coupling Model No. 5100 and also crash tests of TRANSPO Pole Safe Couplings Model Nos., 4100 and 5100.

Test #1

NCHRP 350 TEST 3-61 (Pole Safe® Coupling Model 5100)

E-TECH TEST NO. 03 8287-002

Test Date: Aug. 21, 1996

Vehicle Type: 1988 Ford Festiva

Inertial Mass: 839 kg

Impact Speed: 101.56 km/h

Impact Angle: 0°

Impact Affect.: 0.0 m

SUMMARY OF RESULTS TEST 3-61 POLE-SAFE COUPLING MODEL 5100

Structural Adequacy: Pass

Occupant Impact Velocities (m/s):

Long: 3.27 Pass

Lateral: 0.10

Occupant Ridedown Acceleration (gs)

Long: −1.05 Pass

Lateral: −0.97 Pass

Vehicle Trajectory: Pass

Test #2

Model 4100 and 5100

Pole-Safe® Couplings supporting 16.8 m high 428 kg double mast arm test pole

NCHRP 350 TEST 3-60 (Pole-Safe coupling model 4100)

E-TECH TEST NO.: 03-8287-001

Test Pole: Aug. 20, 1996

Vehicle Type: 1988 Ford Festiva

Inertial mass: 829 kg

Impact Speed: 34.35 km/h

Impact Angle: 0°

Impact Offset: 0.4 m

SUMMARY OF RESULTS TEST 3-60

Pole-Safe Coupling Model 4100

Structural Adequacy: Pass

Occupant Impact Velocities (m/s):

Longitudinal: 4.35 Pass

Lateral: 0.09 Pass

Occupant Ridedown Accelerations (gs):

Longitudinal: −5.39 Pass

Lateral: 2.70 Pass

Vehicle Trajectory: Pass

Dimensions and physical properties of TRANSPO couplings are summarized in the following table:

| Model | 4062 | 4100* | 4125 | 5062 | 5100* | 5125 |
|---|---|---|---|---|---|---|
| Coupling: | | | | | | |
| Length | 188.9 mm | 227.0 mm | 257.0 mm | 184.1 mm | 227.0 mm | 254.0 mm |
| Neck Diameter | 11.18 mm | 16.51 mm | 16.51 mm | 11.17 mm | 16.51 mm | 16.51 mm |
| U.T.S.** | 133.5 kN | 267 kN | 267 kN | 133.5 kN | 267 kN | 267 kN |
| Yield Strength | 89 kN | 191 kN | 191 kN | 89 kN | 191 kN | 191 kN |
| Anchor Bolt | | | | | | |
| Threads | External | External | External | Internal | Internal | Internal |
| Diameter | 16 mm | 25 mm | 32 mm | 16 mm | 25 mm | 32 mm |
| Diameter (Engl.) | 5/8" | 1" | 1¼" | 5/8" | 1" | 1¼" |

The summary of the crash testing is presenting in the following table:

| Test Number | 03-8287-001 | 03-8287-002 |
|---|---|---|
| Test Article - Model Number | 4100 | 5100 |
| Pole Mass | 423 g (1000#) | 423 kg (1000#) |
| Pole Height | 16.8 m (55 ft.) | 16.8 m (55 ft.) |
| Vehicle Mass | 829. kg (1828#) | 839 kg (1850#) |
| Impact Speed | 34.35 km/h (21.3 m/h) | 101.56 km/h (63.11 m/h) |
| Occupant Impact Speed | 4.35 m/s (14.37 ft/s) | 3.27 m/s (10.73 ft/s) |
| Approximate Stub Height | 54 mm (2⅛ in) | 25.4 mm (1 in.)* |

Three couplings broke at the lower neck or notch 18. The fourth broke at the upper wrench flat and was left nearly intact attached to the foundation. However, the fourth coupling was not provided with a fillet 70 and the addition of such fillet should overcome or eliminate this problem.

Extensive analysis and testing have proven that the double neck couplings in accordance with the present invention exhibit exceptional structural strength. By finite element analysis and simulated wind tests have shown that the double neck coupling of the present invention have the tensile strength that allow close to full use of the anchor bolt's potential.

Under impact in loading, the precisely machined double neck geometry of the coupling allows it's two ends to bend in opposite directions. This causes the device to fracture safely at relatively low force and energy levels. Crash tests have indicated that the double neck coupling of the present invention provides less resistance than the values listed in the AASHTO specifications.

In terms of cost, the coupling of the present invention is structurally the most economical light bulb breakaway devices. It is easy to install and requires no special tools, training or not torquing. The couplings and the system within which they are used can be quickly deployed, they eliminate or greatly reduce pole, anchor bolt and foundation damage. In terms of performance, the couplings of the present invention exhibit consistent breakaway characteristics, breaking away safely and consistently on impact from any direction, at bumper height. They exhibit exceptional structural strength and twice the service load carrying capacity of most other breakaway couplings. Of significant importance, as suggested above, is the low stub projection, particularly 1"–2.5" reveal, after impact provides optimum predictable safety to occupants of the motor vehicle as the anchor is designed to breakaway at least at the lower neck of the coupling before failure takes place in any other region of the coupling. In the above tests, the approximate stub heights were 2–1.8" and 1" respectively.

Having described the invention, many modifications thereto will become apparent to those skilled in the art to which it pertains without deviation from the spirit of the invention as defined by the scope of the appended claims.

What I claim is:

1. A multiple necked-down break-away coupling for a highway and roadside appurtenance to be mounted on a base, the coupling defining an axis and comprising a controlled breaking region arranged along said axis and having opposing axial ends; first connecting means for connecting one of said opposing axial ends to the highway or roadside appurtenance; second connecting means for connecting another one of said opposing axial ends to the base on which the highway or roadside appurtenance is to be mounted, said controlled breaking region including at least two axially spaced necked-down portions coaxially arranged between said first and second connecting means, each necked-down portion essentially consisting of two axially aligned conical portions inverted one in relation to the other and generally joined at their apices to form a generally hour-glass shaped configuration having a region of minimal cross-section at an inflection point having a gradually curved annular concave surface defining a radius of curvature, each of said two necked-down portions having different radii of curvature at respective inflection points to provide different failure modes as a function of the position and direction of impact of a force on the appurtenance.

2. A coupling as defined in claim 1, wherein said first and second connecting means each comprises an externally-threaded bolt coextensive with said axis.

3. A coupling as defined in claim 1, wherein said two necked-down portions are provided each proximate to another one of said first and second connecting means to provide an enlarged portion between said necked-down portion that serves as a pivoting arm about which bending of said necked-down portions take place.

4. A coupling as defined in claim 1, wherein said first connecting means comprises an externally threaded bolt co-extensive with said axis and said second connecting means comprises an internally threaded hole coextensive with said axis for receiving an externally threaded bolt mounted on the base on which the highway or roadside appurtenance is to be mounted.

5. A coupling as defined in claim 1, wherein each of said two conical portions forming each necked-down portion defines a base angle α, β respectively, in relation to a plane normal to said axis.

6. A coupling as defined in claim 5, wherein said angles α, β are equal.

7. A coupling as defined in claim 6, wherein α, β equal 45°.

8. A coupling as defined in claim 5, wherein α, β are different angles.

9. A coupling as defined in claim 1, wherein the axial distance between the inflection points of said two necked-down portions is selected within the range of approximately 3–4 inches.

10. A coupling as defined in claim 1, wherein said radii of curvature are selected from the range of approximately 0.1 to 0.225 inches.

11. A coupling as defined in claim 10, wherein the radius of curvature of one necked-down portion is approximately 0.125 inches and the radius of curvature of the other necked-down portion is approximately 0.2 inches.

12. A coupling as defined in claim 1, wherein said necked-down portions define circular cross sections at said inflection points.

13. A coupling as defined in claim 12, wherein the diameter of said necked-down portions at said inflection points are selected within the range of approximately 0.4 to 0.7 inches.

14. A coupling as defined in claim 1, wherein said radii of curvature are selected to have first and second values substantially independently of the parameters or dimensions of said necked-down portions.

15. A multiple necked-down break-away coupling for a highway and roadside appurtenance to be mounted on a base, the coupling defining an axis and comprising a controlled breaking region arranged along said axis and having opposing axial ends; first connecting means for connecting one of said opposing axial ends to the highway or roadside appurtenance; second connecting means for connecting another one of said opposing axial ends to the base on which the highway or roadway appurtenance is to be mounted, said controlled breaking region including at least two axially spaced necked-down portions coaxially arranged between said first and second connecting means, each necked-down portion essentially consisting of two axially aligned conical portions inverted one in relation to the other and generally joined at their apices to form a generally hourglass shaped configuration having a region of minimal cross section at an inflection point having a gradually curved annular concave surface defining a radius of curvature, each of said two necked-down portions having different radii of curvature at respective inflection points to provide different failure modes as a function of the position and direction of impact of a force on the appurtenance, said first and second connecting means each comprising an externally threaded bolt coextensive with said axis, each of said externally threaded bolt having a diameter less than a diameter of the portion of the coupling from which the coupling projects, and further comprising fillet means at the transition points where the diameters change to provide a gradual transition between the diameters.

16. A multiple necked-down break-away coupling for a highway and roadside appurtenance to be mounted on a base, the coupling defining an axis and comprising a controlled breaking region arranged along said axis and having opposing axial ends; first connecting means for connecting one of said opposing axial ends to the highway or roadside appurtenances; second connecting means for connecting another one of said opposing axial ends to the base on which the highway or roadside appurtenance is to be mounted, said controlled breaking region including at least two axially spaced necked-down portions coaxially arranged between said first and second connecting means, each necked-down portion essentially consisting of two axially aligned conical portions inverted one in relation to the other and generally joined at their apices to form a generally hourglass shaped configuration having a region of minimal cross section at an inflection point having a gradually curved annular concave surface defining a radius of curvature, each of said two necked-down portions having different radii of curvature at respective inflection points to provide different failure modes as a function of the position and direction of impact of a force on the appurtenance, said first connecting means comprising an externally threaded bolt coextensive with said axis and said second connecting means comprising an internally threaded hole coextensive with said axis for receiving an externally threaded bolt mounted on the base on which the highway or roadside appurtenance is to be mounted, each externally threaded bolt having a diameter less than a diameter the portion of the coupling from which it projects, and further comprising fillet means at the transition point where the diameter changes to provide a gradual transition between the diameters.

* * * * *